United States Patent
Ruiz, II

(10) Patent No.: US 11,099,054 B2
(45) Date of Patent: Aug. 24, 2021

(54) CALIBRATION TOOL FOR OPEN CHANNEL FLOW MEASUREMENT

(71) Applicant: Inframark, LLC, Horsham, PA (US)

(72) Inventor: Elias Ruiz, II, Edmond, OK (US)

(73) Assignee: Inframark, LLC, Horsham, PA (US)

( * ) Notice: Subject to any disclaimer, the term of this patent is extended or adjusted under 35 U.S.C. 154(b) by 153 days.

(21) Appl. No.: 16/592,483

(22) Filed: Oct. 3, 2019

(65) Prior Publication Data

US 2020/0109984 A1 Apr. 9, 2020

Related U.S. Application Data

(60) Provisional application No. 62/740,745, filed on Oct. 3, 2018.

(51) Int. Cl.
| | |
|---|---|
| *G01F 25/00* | (2006.01) |
| *G01C 9/36* | (2006.01) |
| *G01B 3/04* | (2006.01) |
| *G01B 3/1003* | (2020.01) |
| *G01F 1/00* | (2006.01) |
| *G01F 1/66* | (2006.01) |
| *G01F 23/04* | (2006.01) |

(52) U.S. Cl.
CPC ........... *G01F 25/0007* (2013.01); *G01B 3/04* (2013.01); *G01B 3/1004* (2020.01); *G01C 9/36* (2013.01); *G01F 1/002* (2013.01); *G01F 1/66* (2013.01); *G01F 23/04* (2013.01)

(58) Field of Classification Search
CPC ........ G01F 25/0007; G01F 1/66; G01F 23/04; G01F 1/002; G01B 3/1004; G01B 3/04; G01B 21/042; G01B 21/047; G01C 9/36
See application file for complete search history.

(56) References Cited

U.S. PATENT DOCUMENTS

| | | | | |
|---|---|---|---|---|
| 5,952,583 | A * | 9/1999 | Chang | G01F 1/002 73/861.18 |
| 7,530,174 | B1 * | 5/2009 | Kimball | G01C 9/26 33/354 |
| 2015/0226588 | A1 * | 8/2015 | Huang | G01C 13/008 73/861.18 |

* cited by examiner

*Primary Examiner* — Benjamin R Schmitt
(74) *Attorney, Agent, or Firm* — Troutman Pepper Hamilton Sanders LLP

(57) ABSTRACT

Embodiments provide a calibration tool for measuring a distance between a transducer and a liquid surface of an open channel, including: a pole; a flat board attached to the pole, configured to reflect a signal from the transducer, wherein the flat board is substantially perpendicular to the pole; a level device provided on the flat board, configured to ensure that the flat board is substantially parallel to a bottom of the open channel during a measurement; and a measuring scale provided on the pole.

20 Claims, 5 Drawing Sheets

CALIBRATION TOOL FOR OPEN CHANNEL FLOW MEASUREMENT

CROSS REFERENCE TO RELATED APPLICATIONS

This application is a non-provisional application, which claims the benefit of U.S. Provisional Patent Application Ser. No. 62/740,745, filed Oct. 3, 2018, which is incorporated herein by reference in its entirety.

TECHNICAL FIELD

The present disclosure relates generally to a calibration tool for open channel flow measurement.

BACKGROUND

Open channel flow is any flow through a ditch or conduit that is not pressurized. A flow meter, for example, an ultrasonic flow meter, is used to measure the open channel flow (or a flow in a holding tank containing a constantly moving surface). As shown in FIG. 1, in the flow measuring system 100, the flow meter 104 is paired with a transducer 102 which transmits a signal, for example, a radar signal, a sonar signal, or an ultrasound signal, etc., to detect the liquid surface of the open channel flow 106. During open channel flow calibration, because of the constant motion of a liquid surface, it is extremely difficult to accurately get a precise measurement between the transducer 102 and a liquid surface (e.g., water surface), which will be used for flow measurement by the flow meter 104. Additionally, the transducer 102 for measuring a liquid level is often installed over an open channel at a location that makes physical access difficult for a technician to perform calibration operations.

Currently, a mechanical staff gauge is mounted to the side wall of a flume (open channel) to provide a measurement between the transducer 102 and the liquid surface. Generally, the mechanical staff gauge is measured in a tenth of foot, and the error of open channel flow measurement is within +/−10%.

Thus, there is a need to provide a calibration tool for an open channel flow 106 to get a precise measurement between the transducer 102 and the liquid surface, so that the error of measuring the open channel flow 106 (e.g., an effluent flow), can be kept within an acceptable tolerance.

SUMMARY

Embodiments provide a calibration tool for measuring a distance between a transducer and a liquid surface of an open channel, comprising: a pole; a flat board attached to the pole, configured to reflect a signal from the transducer, wherein the flat board is substantially perpendicular to the pole; a level device provided on the flat board, configured to ensure that the flat board is substantially parallel to a bottom of the open channel during a measurement; and a measuring scale provided on the pole.

Embodiments further provide a calibration tool, wherein the measuring scale is engraved on the pole.

Embodiments further provide a calibration tool, wherein the measuring scale is provided on a measuring tape, and the measuring tape is attached on the pole.

Embodiments further provide a calibration tool, wherein the flat board includes a plurality of parts, and the level device is provided on one of the plurality of parts.

Embodiments further provide a calibration tool, wherein a cross section of the pole is in a shape of square, round, rectangle, or polygon.

Embodiments further provide a calibration tool, wherein the level device is a fish eye level.

Embodiments further provide a calibration tool, wherein the pole includes a plurality of sections; wherein the calibration tool further comprises at least one adjusting component attached on the pole, configured to adjust a length of one of the plurality of sections.

Embodiments further provide a calibration tool, further comprising a base attached to a bottom of the pole, wherein the base presses against the bottom of the open channel during the measurement.

Embodiments provide a method of making calibration using a calibration tool, wherein the calibration tool includes a pole and a flat board attached to the pole, comprising: placing the calibration tool in an open channel, wherein a base of the pole presses against a bottom of the open channel; performing a measurement of a distance between a bottom of a transducer and a liquid surface of the open channel in a predefined number of iterations. In each iteration: adjusting a position of the flat board along the pole; maintaining a surface of the flat board substantially parallel to the liquid surface; observing a flow meter reading of the distance between the bottom of the transducer and the liquid surface; adjusting the flow meter reading to match a reading of a measuring scale on the pole, wherein the reading of the measuring scale is aligned with the position of the flat board.

Embodiments further provide a method of making calibration using a calibration tool, further comprising: adjusting the flow meter reading to match the reading of the measuring scale on the pole only if an error of the flow meter reading is beyond a predefined threshold.

Embodiments further provide a method of making calibration using a calibration tool, in a first iteration, the flat board is adjusted to be at a position proximate to and above the liquid surface; in a second iteration, the flat board is adjusted to be located between the liquid surface and a position aligned with a height of the open channel; and in a third iteration, the flat board is adjusted to be located at a position aligned with the height of the open channel.

Embodiments further provide a method of making calibration using a calibration tool, wherein the measuring scale is provided on a measuring tape, and the measuring tape is attached on the pole.

Embodiments further provide a method of making calibration using a calibration tool, further comprising: applying a liquid finding paste on the pole at a position aligned with the liquid surface.

Embodiments further provide a method of making calibration using a calibration tool, further comprising: maintaining the surface of the flat board substantially parallel to the liquid surface using a level device provided on the flat board.

Embodiments further provide a method of making calibration using a calibration tool, wherein the level device is a fish eye level.

Embodiments provide a calibration tool for measuring a distance between a transducer and a liquid surface of an open channel, comprising: a pole; a flat board attached to the pole, configured to reflect a signal from the transducer, wherein the flat board is substantially perpendicular to the pole; a level device provided on the flat board, configured to ensure that the flat board is substantially parallel to a bottom of the open channel during a measurement; a measuring tape having a measuring scale, wherein the measuring tape is attached on the pole; and at least one adjusting component attached on the pole. The pole includes a plurality of sections, the at least one adjusting component is configured to adjust a length of one of the plurality of sections.

Embodiments further provide a calibration tool, wherein the flat board includes a plurality of parts, and the level device is provided on one of the plurality of parts.

Embodiments further provide a calibration tool, wherein a cross section of the pole is in a shape of square, round, rectangle, or polygon.

Embodiments further provide a calibration tool, wherein the pole is made of wood, metal, alloy, or plastic.

Embodiments further provide a calibration tool, wherein the pole is solid or hollow.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Embodiments of the present invention provide a calibration tool, which would allow for a more precise measurement between a transducer and a target of the calibration tool. A calibration tool which has a stable board and makes a known measurement is provided. The calibration tool is easy to make, portable and easy to maintain. With the calibration tool, the error of open channel flow measurement is within +/−1%.

Figure 1:
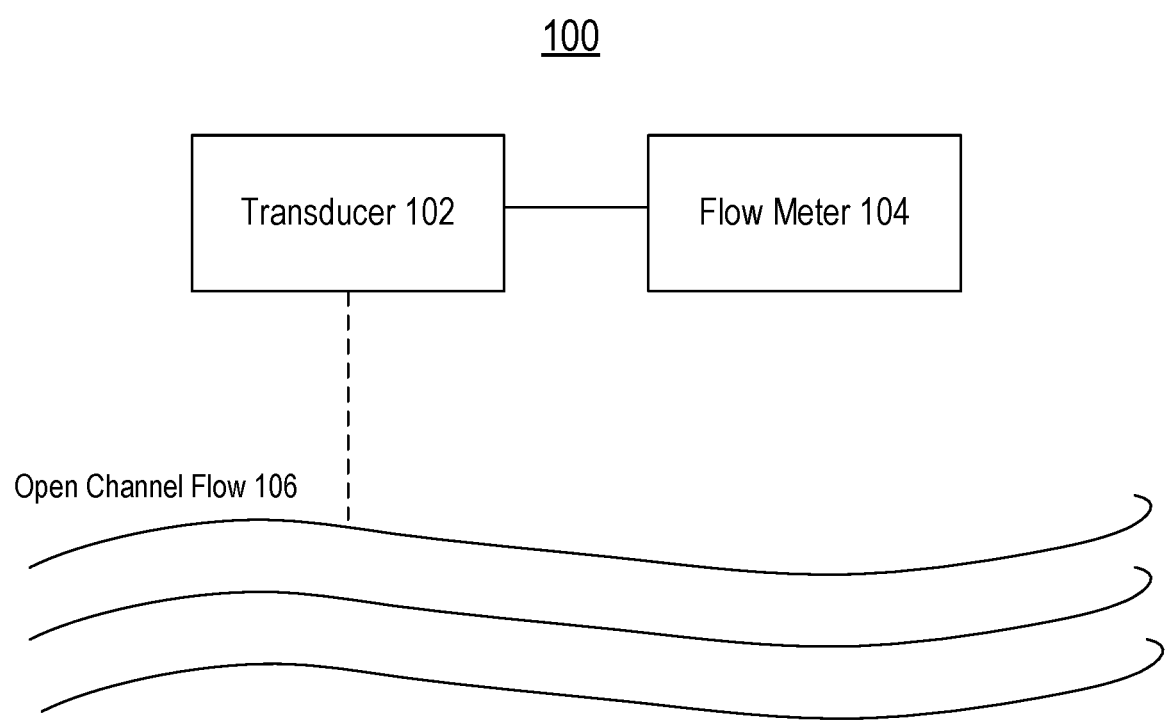
FIG. 1 depicts a systematic diagram of one illustrative embodiment of flow measuring system 100.
Figure 2:
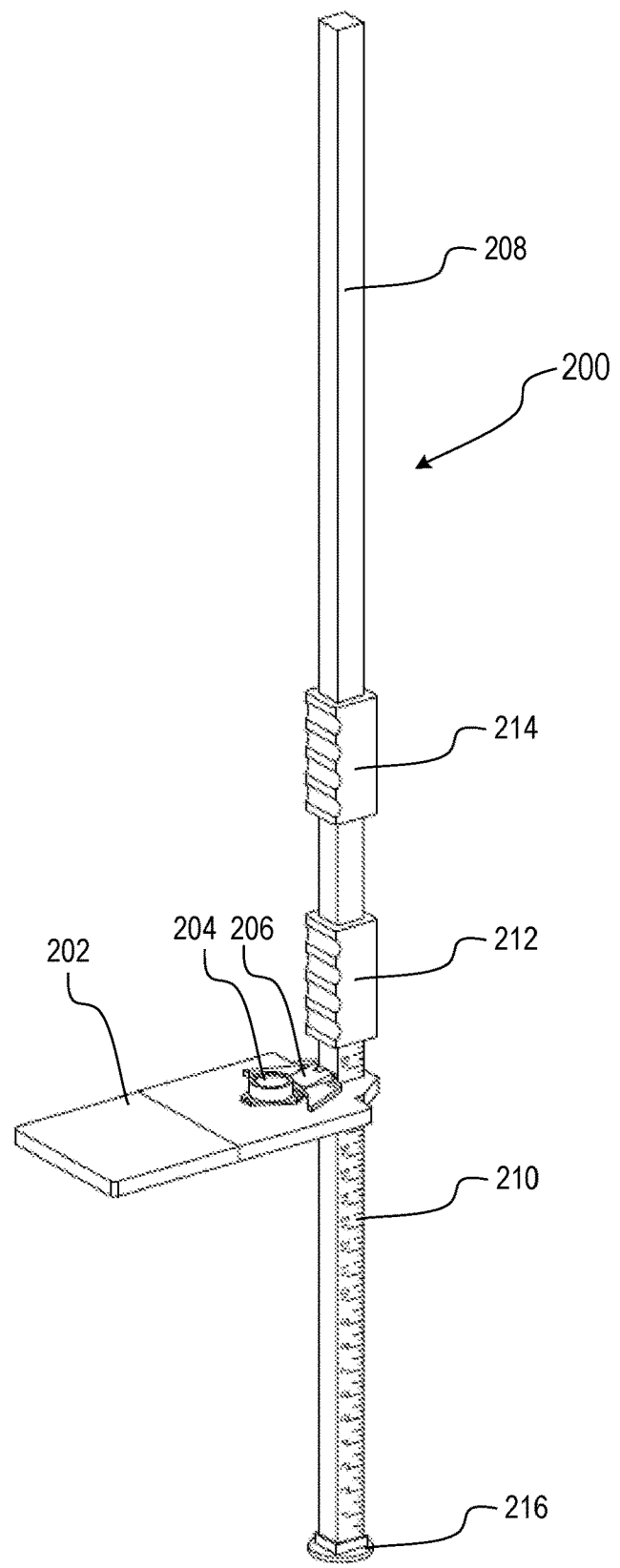
FIG. 2 depicts a perspective view diagram of one illustrative embodiment of calibration tool 200.

FIG. 2 depicts a perspective view diagram of one illustrative embodiment of calibration tool 200. As shown in FIG. 2, in an embodiment, the calibration tool 200 includes a pole (also called a staff) 208 and a board (also called a target) 202 attached to the pole 208. The bottom of the board 202 is used to reflect a signal from the transducer 102 (not shown in FIG. 2). The board 202 can be in any regular or irregular shape, for example, rectangular, circular, square, etc. The board 202 can be any size, as long as the size is sufficient to make the board 202 work as a stable reflective surface for the signal from the transducer 102. In an example, the board 202 is rectangular, and the size of the board 202 is 6"×8". In an embodiment, the board 202 is constructed in one piece. In another embodiment, the board 202 is constructed in a plurality of parts (a plurality of small boards)—e.g., in one embodiment two parts (two small boards)—which allows for the footprint of the board 202 to be reduced for use in tight areas. A level device 204, for example a fish eye level, is attached to the board 202. The level device 204 ensures that a calibration technician maintains a plumb (vertical) surface (e.g., of the pole 208) or a level (horizontal) surface (e.g., of the board 202) during calibration.

In an embodiment, the board 202 is adjustable to various heights that are marked on the pole (rod) 208. The board 202 can be secured to the pole 208 at a desired position with any connector or fastener. In an embodiment, the connector or fastener comprises a bracket 206 having a thumb screw that can be tightened, thereby tightly connecting the board 202 to the pole 208 at a known location (e.g., a known height). The board 202 can be made of any material, for example, wood, carbon board, plastic, metal, etc., as long as the board 202 is flat and can stably reflect the signal from the transducer 102. The pole 208 can be made of any waterproof material, e.g., wood, metal, alloy, plastic, etc., and the pole 208 can be solid or hollow. A cross section of the pole 208 can be in any shape, e.g., square, round, rectangle, polygon, etc. In an embodiment, the pole 208 is made of aluminum square channel. In an embodiment, a measuring tape 210 is attached to one side of the pole 208, for example, one side of the channel stock. In another embodiment, a measuring scale is engraved on the pole 208. In an embodiment, the pole 208 is composed of multiple sections (e.g., three sections), and one or more of the sections are adjustable (i.e., the length of the section of pole can be adjusted) for deeper channel calibrations. For example, the length of the section between the two adjusting components 212 and 214 is adjustable. The length of the section is adjusted according to a position of the technician who makes the calibration, and a height of the open channel. In another embodiment, the pole 208 is composed of a plurality of sections, and each section can be lengthened.

Figure 3:
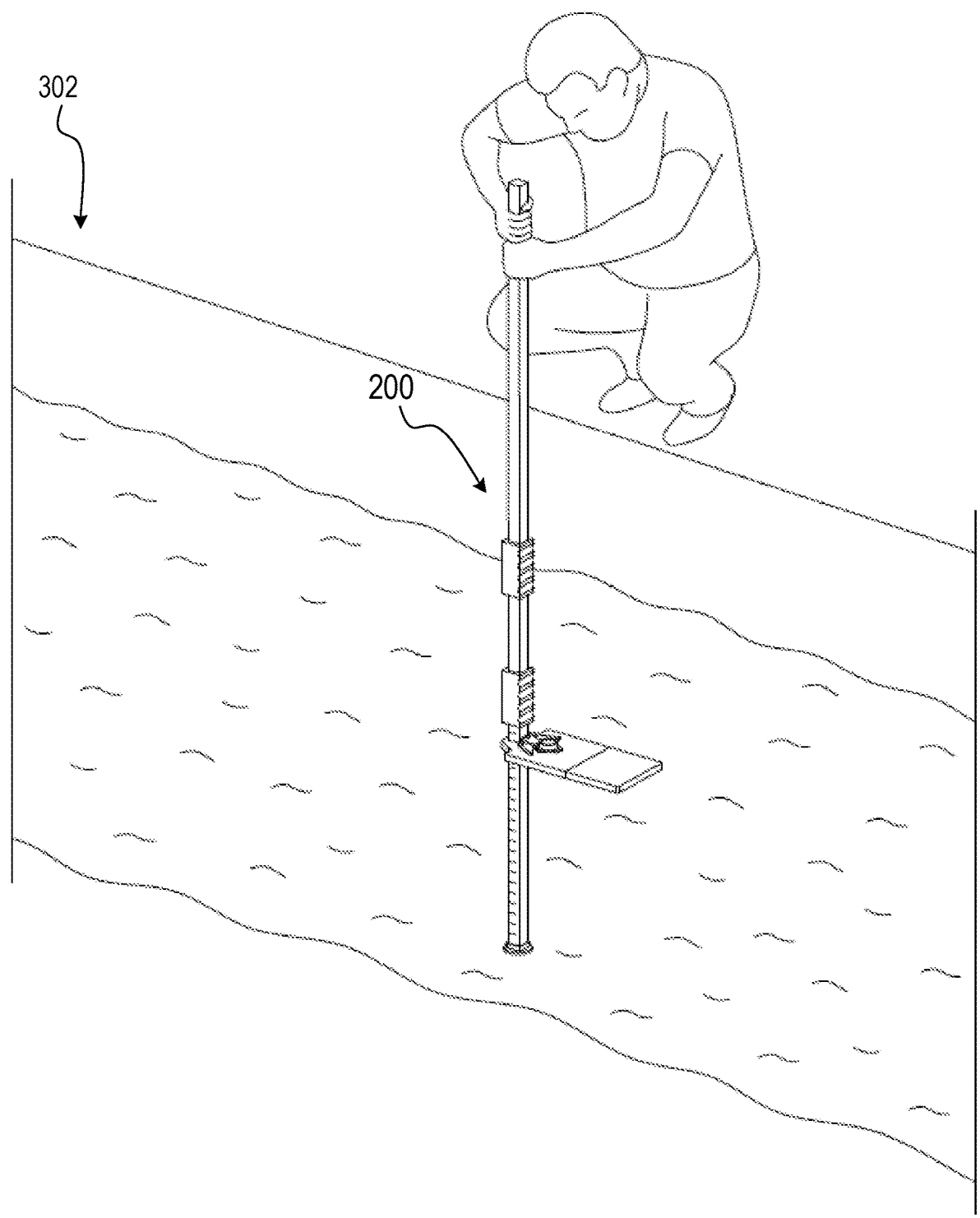
FIG. 3 depicts a diagram of using the calibration tool 200 according to embodiments provided herein.

A base 216 is attached to the bottom of the pole 208, and can be made of any waterproof material, for example plastic, rubber, etc. During the measurement as shown in FIG. 3, the base 216 presses against the bottom of the open channel 302, so that the liquid flow cannot push or move the pole 208.

Figure 4:
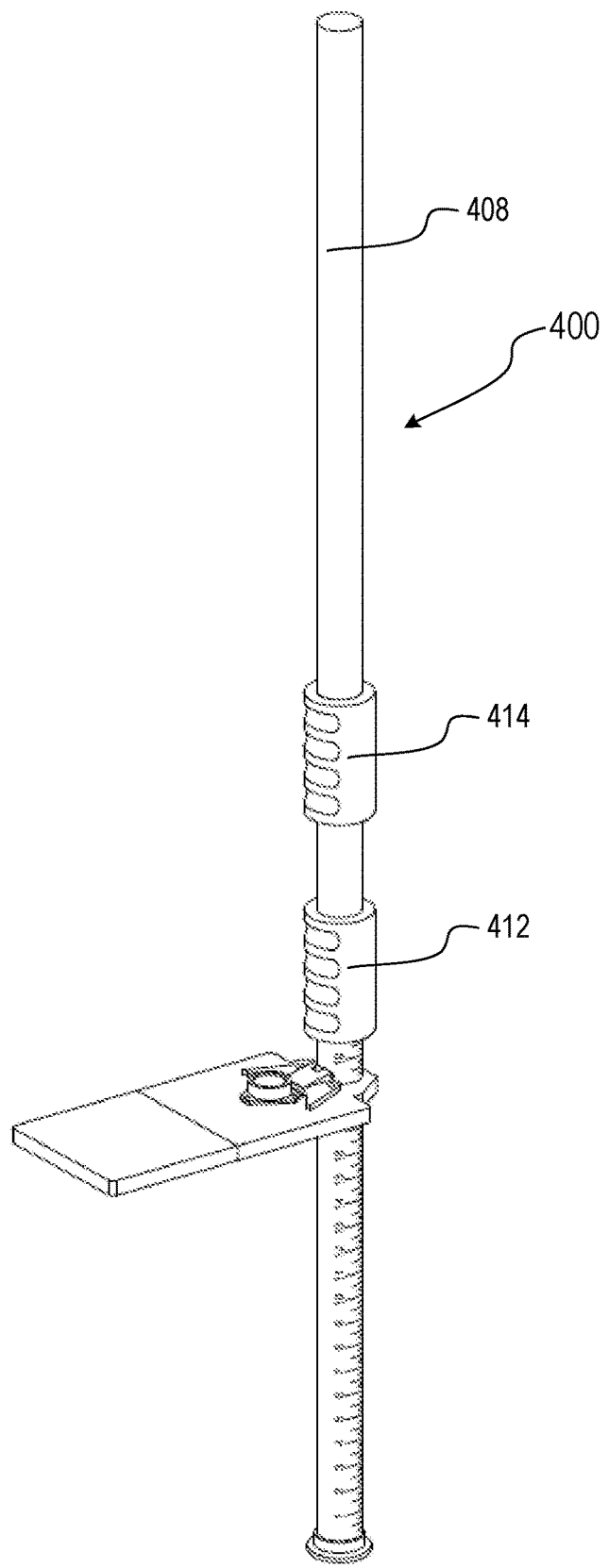
FIG. 4 depicts a perspective view diagram of another illustrative embodiment of calibration tool 400.

FIG. 4 depicts a perspective view diagram of another illustrative embodiment of calibration tool 400. The difference between the calibration tool 200 as shown in FIG. 2 and the calibration tool 400 as shown in FIG. 4 is the shape of the cross section of the pole. The cross section of the pole 208 is in a shape of square, while the cross section of the pole 408 is in a shape of round or circle. Accordingly, the shapes of the two adjusting components 412 and 414 are also adaptively changed to be engaged with the pole 408.

Figure 5:
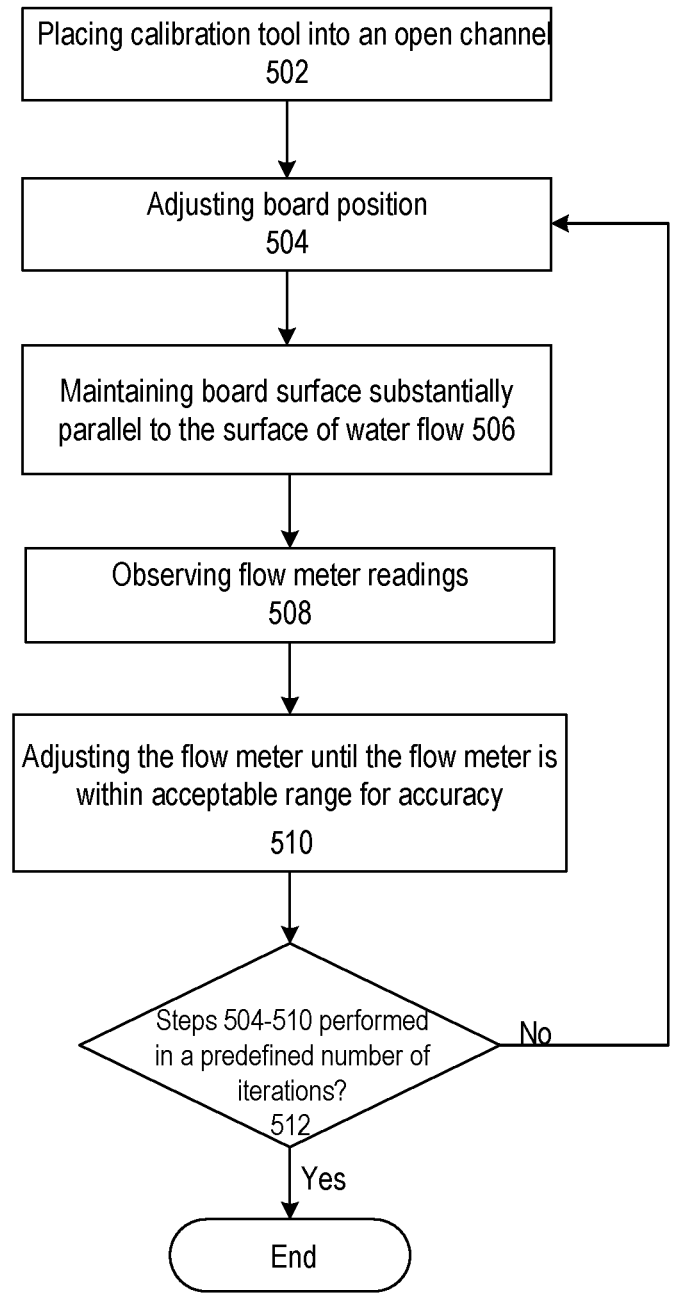
FIG. 5 depicts a flow chart of a method 500 of making calibration using the calibration tool according to embodiments provided herein.

FIG. 5 depicts a flow chart of a method 500 of making calibrations using the calibration tool according to embodiments provided herein. Referring to FIGS. 1-5, at step 502, the calibration tool 200 is placed into an open channel 302. The base 216 of the pole 208 presses against the bottom of the open channel 302.

At step 504, a position of board 202 is adjusted. The board 202 is located outside of the water surface to avoid interferences from the water, e.g., water ripples, water waves, etc. In an embodiment, liquid finding paste (e.g., water finding paste) is applied to the pole 208 at a position which is anticipated to be aligned with the water surface to indicate water detection. In an embodiment, the board 202 is about one inch or two inches above the water surface. In an embodiment, the board 202 is as close to the water surface as possible for the accuracy of the measurement, while avoiding interferences of the water. This may be referred to as a near calibration position.

At step 506, the level device 204, e.g., a fish eye bubble level, mounted on the board 202, is checked to make sure that the pole 208 is substantially vertical while the board 202 is substantially horizontal. Accordingly, the board surface is maintained substantially parallel to the surface of the water flow.

At step 508, flow meter readings, including a reading of the distance between the bottom surface of the transducer 102 and the water surface, and a reading of the calculated flow data (e.g. volume of the flow), are observed and may be recorded.

At step 510, if the flow meter 104 is within acceptable range for accuracy (i.e., the error of open channel flow measurement is within a predefined threshold, e.g. +/−10%, +/−5%, +/−1%, etc.), then no adjustments of the flow meter 104 is needed; otherwise, the flow meter 104 needs to be adjusted to match the distance measurement using the calibration tool 200. Specifically, the reading of the distance on the flow meter 104 is compared with the reading on the measuring tape 210, and the reading of the flow meter 104 is adjusted to match the reading on the measuring tape 210 (i.e., the position of the board 202). With the adjustments, the flow meter 104 is calibrated to make accurate measurement.

At step 512, in an embodiment, the number of iterations of performing the steps 504-510 are checked to ensure that the steps 504-510 are repeated for a predefined number of times (iterations), e.g., three times (i.e., three iterations). In an embodiment, the position of the board 202 is adjusted in each iteration. For example, in the first iteration, the board 202 is close to the water surface, e.g., one or two inches above the water surface. In the second iteration, the board 202 is a little further away from the water surface, e.g. the board is located between the water surface and a position aligned with the height of the open channel. This may be referred to as an intermediate calibration position. In the third iteration, the board 202 is aligned with the height of the open channel (the maximum span of the open channel). This may be referred to as a far calibration position. After the calibration process, a more accurate flow measurement based on the distance between the transducer 102 and the board 202 is obtained accordingly.

The present description may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description to a single feature/element being present or require that a plurality of such features/elements be present. To the contrary, these terms/phrases only require at least a single feature/element with the possibility of a plurality of such features/elements being within the scope of the description.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention. For example, the calibration tool can be used in other arts in addition to open channel flow measurement. The calibration tool 200 provides a stable known measurement between two known points, utilizing an ultrasonic, sonar or radar signal which reflects off the surface of a target (board) 202 of the calibration tool 200.

It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention.

I claim:

1. A calibration tool for measuring a distance between a transducer and a liquid surface of an open channel, comprising:
   a pole;
   a flat board attached to the pole, configured to reflect a signal from the transducer, wherein the flat board is substantially perpendicular to the pole;
   a level device provided on the flat board, configured to ensure that the flat board is substantially parallel to a bottom of the open channel during a measurement; and
   a measuring scale provided on the pole.

2. The calibration tool as recited in claim 1, wherein the measuring scale is engraved on the pole.

3. The calibration tool as recited in claim 1, wherein the measuring scale is provided on a measuring tape, and the measuring tape is attached to the pole.

4. The calibration tool as recited in claim 1, wherein the flat board includes a plurality of parts, and the level device is provided on one of the plurality of parts.

5. The calibration tool as recited in claim 1, wherein a cross section of the pole is in a shape of square, round, rectangle, or polygon.

6. The calibration tool as recited in claim 1, wherein the level device is a fish eye level.

7. The calibration tool as recited in claim 1, wherein the pole includes a plurality of sections; wherein the calibration tool further comprises at least one adjusting component attached on the pole, configured to adjust a length of one of the plurality of sections.

8. The calibration tool as recited in claim 1, further comprising a base attached to a bottom of the pole, wherein the base presses against the bottom of the open channel during the measurement.

9. A method of calibrating using a calibration tool, wherein the calibration tool includes a pole and a flat board attached to the pole, comprising:
   placing the calibration tool in an open channel, wherein a base of the pole presses against a bottom of the open channel;

performing a measurement of a distance between a bottom of a transducer and a liquid surface of the open channel in a predefined number of iterations;
in each iteration:
adjusting a position of the flat board along the pole;
maintaining a surface of the flat board substantially parallel to the liquid surface;
observing a flow meter reading of the distance between the bottom of the transducer and the liquid surface;
adjusting the flow meter reading to match a reading of a measuring scale on the pole, wherein the reading of the measuring scale is aligned with the position of the flat board.

10. The method of claim 9, further comprising:
adjusting the flow meter reading to match the reading of the measuring scale on the pole only if an error of the flow meter reading is beyond a predefined threshold.

11. The method of claim 9, in a first iteration, the flat board is adjusted to be at a position proximate to and above the liquid surface; in a second iteration, the flat board is adjusted to be located between the liquid surface and a position aligned with a height of the open channel; and in a third iteration, the flat board is adjusted to be located at a position aligned with the height of the open channel.

12. The method of claim 9, wherein the measuring scale is provided on a measuring tape, and the measuring tape is attached on the pole.

13. The method of claim 9, further comprising:
applying a liquid finding paste on the pole at a position aligned with the liquid surface.

14. The method of claim 9, further comprising:
maintaining the surface of the flat board substantially parallel to the liquid surface using a level device provided on the flat board.

15. The method of claim 14, wherein the level device is a fish eye level.

16. A calibration tool for measuring a distance between a transducer and a liquid surface of an open channel, comprising:
a pole;
a flat board attached to the pole, configured to reflect a signal from the transducer, wherein the flat board is substantially perpendicular to the pole;
a level device provided on the flat board, configured to ensure that the flat board is substantially parallel to a bottom of the open channel during a measurement;
a measuring tape having a measuring scale, wherein the measuring tape is attached on the pole; and
at least one adjusting component attached on the pole,
wherein the pole includes a plurality of sections, the at least one adjusting component is configured to adjust a length of one of the plurality of sections.

17. The calibration tool as recited in claim 16, wherein the flat board includes a plurality of parts, and the level device is provided on one of the plurality of parts.

18. The calibration tool as recited in claim 16, wherein a cross section of the pole is in a shape of square, round, rectangle, or polygon.

19. The calibration tool as recited in claim 16, wherein the pole is made of wood, metal, alloy, or plastic.

20. The calibration tool as recited in claim 16, wherein the pole is solid or hollow.

* * * * *